(12) United States Patent
Germano

(10) Patent No.: US 10,323,602 B2
(45) Date of Patent: Jun. 18, 2019

(54) PISTON BOWL RIM WITH FATIGUE RESISTANCE

(71) Applicant: GM GLOBAL TECHNOLOGY OPERATIONS LLC, Detroit, MI (US)

(72) Inventor: Francesco Germano, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 15/675,998

(22) Filed: Aug. 14, 2017

(65) Prior Publication Data
US 2019/0048822 A1 Feb. 14, 2019

(51) Int. Cl.
| | |
|---|---|
| *F02F 3/26* | (2006.01) |
| *F02B 23/06* | (2006.01) |
| *F02F 3/28* | (2006.01) |
| *F02F 3/24* | (2006.01) |

(52) U.S. Cl.
CPC ............. *F02F 3/26* (2013.01); *F02B 23/069* (2013.01); *F02B 23/0624* (2013.01); *F02B 23/0684* (2013.01); *F02F 3/24* (2013.01); *F02F 3/28* (2013.01)

(58) Field of Classification Search
CPC ........ F02F 3/26; F02F 3/14; F02F 3/28; F02F 3/24; F02B 23/0624; F02B 23/0684; F02B 23/0678; F02B 23/0672; F02B 23/069; F02B 23/0681
See application file for complete search history.

(56) References Cited

U.S. PATENT DOCUMENTS

| | | | |
|---|---|---|---|
| 6,494,178 B1 | 12/2002 | Cleary et al. | |
| 6,588,396 B1 | 7/2003 | Cleary et al. | |
| 2010/0162986 A1* | 7/2010 | Grossle | F02B 23/06 123/193.6 |
| 2014/0230774 A1* | 8/2014 | Schneider | F02F 3/003 123/193.6 |

* cited by examiner

*Primary Examiner* — Jacob M Amick
(74) *Attorney, Agent, or Firm* — Harness, Dickey & Pierce, P.L.C.

(57) ABSTRACT

A piston with an improved bowl geometry includes a piston body having a generally planar crown and a skirt extending from the crown. An oval or multi-lobed bowl rim of a combustion bowl that is recessed in the crown so that the sides of the bowl rim are provided with increased material to resist fatigue along the pin plane, optionally along the thrust/antithrust plane and generally optionally along other planes between the pin plane and the thrust/antithrust plane.

8 Claims, 4 Drawing Sheets

PISTON BOWL RIM WITH FATIGUE RESISTANCE

FIELD

The present disclosure relates to a piston for internal combustion engine and, more particularly, to a piston bowl geometry.

BACKGROUND

This section provides background information related to the present disclosure which is not necessarily prior art.

A circular piston bowl is commonly used in internal combustion engines wherein the piston crown itself forms the combustion chamber. The piston bowl controls the movement of air and fuel as the piston comes up for the compression stroke. The air and fuel swirl into a vortex inside the piston bowl before combustion takes place, creating a better mixture. By affecting the air/fuel mixture, better and more efficient combustion can be achieved, which leads to more power and optimized fuel economy.

The bowl rim is the higher temperature zone of the piston, due to the sharp edge effect and position in the combustion chamber. The concentration of thermo-mechanical fatigue brought on by alternate fatigue in tension and in compression can be in the bowl and on the bowl rim corresponding to the pin plane and thrust/antithrust plane in aluminum pistons. In steel pistons the concentration of oxidation formation occurs generally where the metal temperature is highest in the bowl and the on the bowl rim.

In order to mitigate the temperature and cooling of the piston, the piston bowl and the bowl rim, in some pistons an oil cooling gallery can be provided with enter/exit ports. The oil cooling flow is supplied from the bottom piston side, enters by inlet ports, circulates in the piston cooling gallery and exits from the outlet ports.

Accordingly, it is desirable to make the piston stronger in the bowl rim areas that are more critical due to high temperature fatigue mainly along the thrust/antitrust plane and pin plane with an optimal bowl rim shape and oil gallery shape/path in the pistons for an internal combustion engine.

SUMMARY

This section provides a general summary of the disclosure, and is not a comprehensive disclosure of its full scope or all of its features.

The present disclosure provides a piston with an improved bowl geometry. The piston includes a piston body having a generally planar crown (with optional valve pockets) and a skirt extending from the crown. An oval or multi-lobed combustion bowl is recessed in the crown so that the sides of the combustion bowl are provided with increased material to resist fatigue along the pin plane and optionally along the thrust/antithrust plane, optionally along the thrust/antithrust plane and optionally along the bowl rim stress concentrated areas (for aluminum alloy pistons) or along oxidation concentration areas (for steel alloys/other metals pistons).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
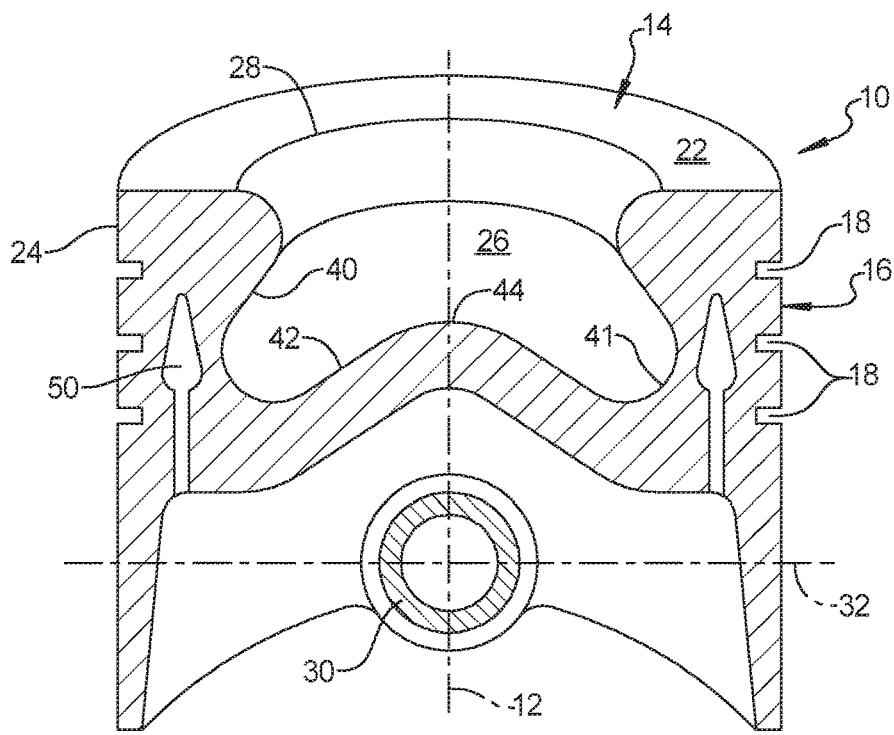
FIGS. 1A and 1B are cross-sectional perspective views of a piston according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1B:
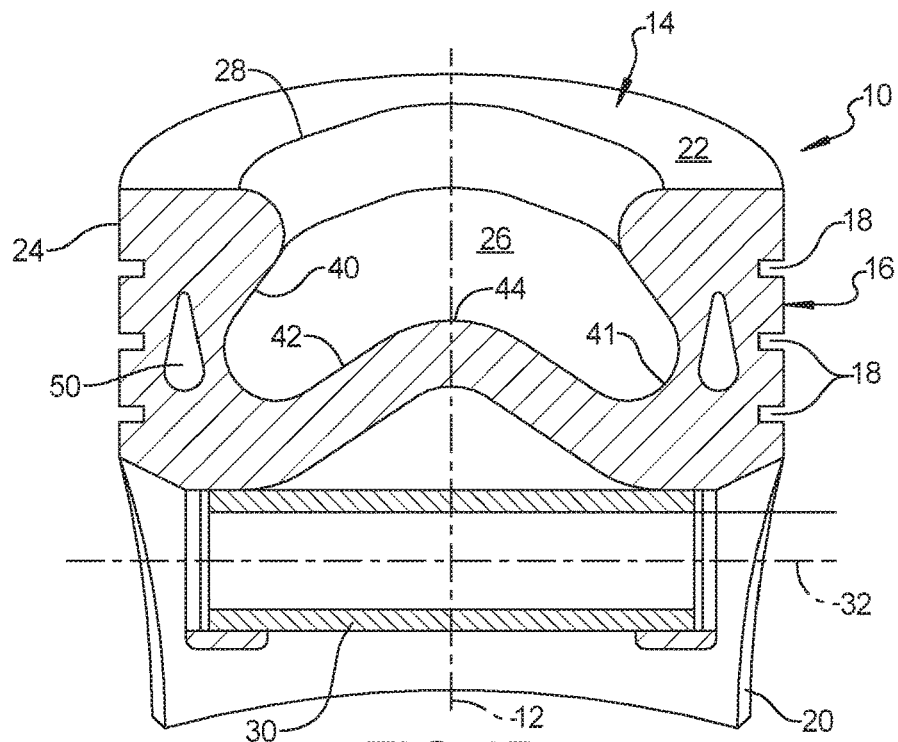

Referring first to FIGS. 1A and 1B of the drawings, a cross sectional view of a piston 10 which is adapted to be reciprocatingly received in a cylinder along a central axis 12, as is known in the art. The piston 10 generally has a cylindrical shape centered on the axis 12 and includes a crown 14, a ring belt 16 with piston ring grooves 18 and one or more skirts 20 extending axially from the ring belt 16. The skirts 20 are extended generally along thrust sides of the piston. The crown 14 has a generally planar upper surface 22 (that can optionally include valve pockets) extending inward from a side wall 24 and generally defining the top of the piston 10. A combustion bowl 26 includes a bowl rim 28 extending downward from the planar surface 22 that can optionally be centered on the central axis 12. As is known in the art, the piston 10 is supported by a piston pin 30 that connects the piston 10 to a connecting rod (not shown). The piston pin 30 has a piston pin axis 32 that is disposed within a vertical piston pin plane along which the cross sectional view of FIG. 1 is cut vertically through a center of the piston 10. A thrust/anti-thrust axis 40 (see FIG. 2) is perpendicular to the piston pin axis 32.

Figure 2:
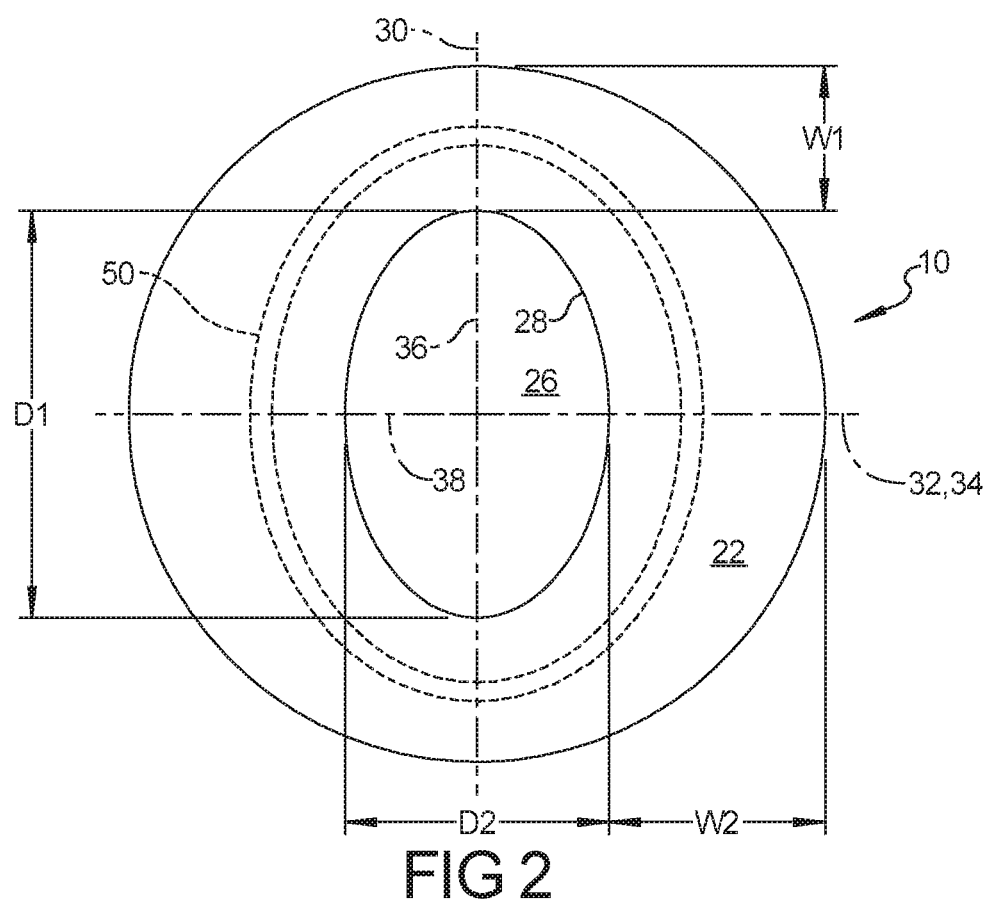
FIG. 2 is a top plan view of a piston having a combustion bowl according to the principles of the present disclosure.

With reference to FIG. 2, the combustion bowl rim 28 can be in the shape of an oval having a larger width dimension D1 along a major axis 36 extending perpendicular to the vertical piston pin plane 34 and a smaller width dimension D2 along a minor axis 38 extending parallel to the piston pin plane 34. Accordingly, the crown surface 14 has increased width W2 (i.e. increased material) on opposite sides of the combustion bowl rim 28 in a direction parallel to the piston pin plane 34. As shown in FIG. 1, the bowl sidewalls 40 widen out below the bowl rim 28 to define an undercut region that generally follows a circular contour or the rim 28 contour. A bottom surface 42 of the piston bowl 26 can be contoured so as to have a raised center region 44. The mounded center region 44 can be raised relative to the bottom-most surface 42 of the combustion bowl 26. Accordingly, the combustion bowl 26 can follow a circular bowl base 41 path (around piston axis 12) or can follow an oval shape.

Figure 3A:
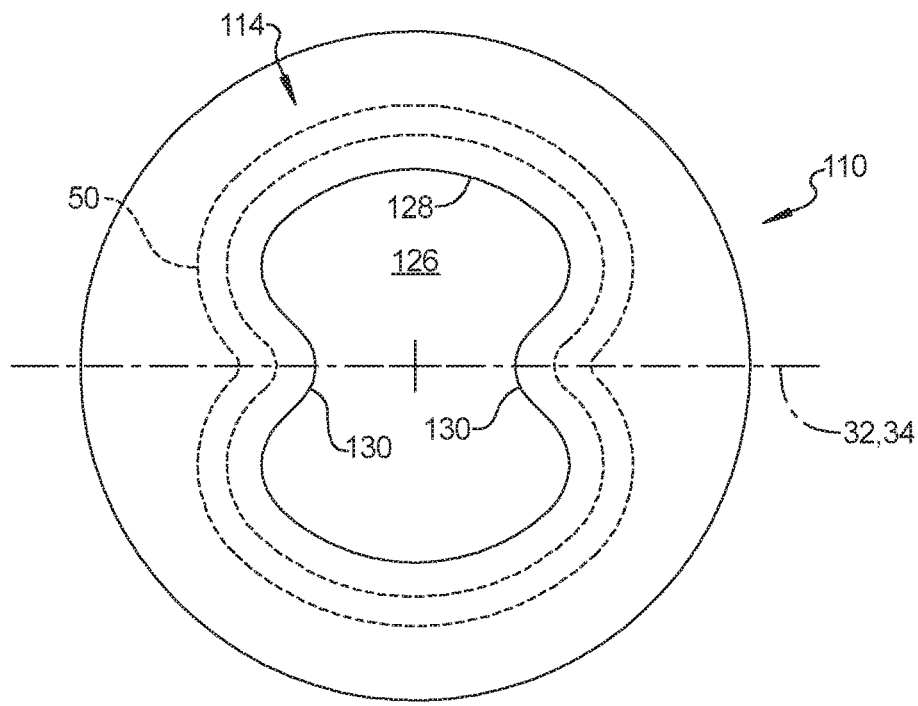
FIG. 3A is a top plan view of a piston having an alternative combustion bowl according to the principles of the present disclosure.

Alternative to the oval shaped combustion bowl 26, as shown in FIG. 2, the piston 110 can include a combustion bowl 126 with a bowl rim 128 extending from the planar crown surface 22, as shown in FIG. 3A. The bowl rim 128 can be provided with two opposing lobes 130 (i.e. regions of the combustion bowl rim having a reduced diameter) extending inward in a direction parallel to the piston pin axis 32 so as to provide the crown surface 114 with increased dimension (i.e. increased material) on opposite sides of the combustion bowl rim 128 in a direction parallel to the vertical piston pin plane 34. Accordingly, the combustion bowl rim 128 has a minimum diameter dimension along the vertical piston plane and a larger maximum diameter that can be provided along the remainder or a portion of the remainder of the combustion bowl rim.

Figure 3B:
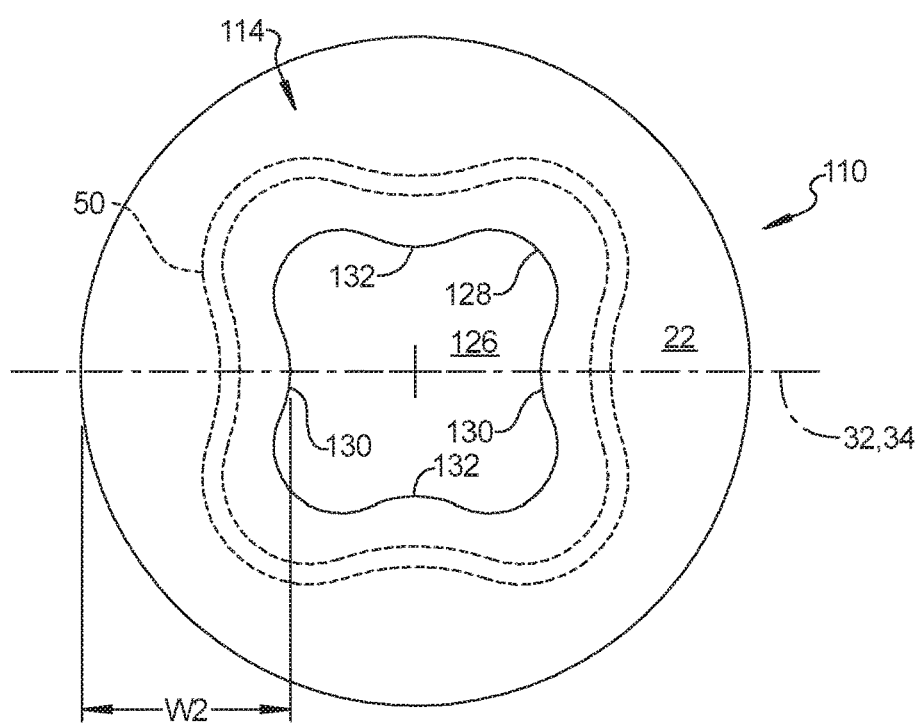
FIG. 3B is a top plan view of a piston having an alternative combustion bowl according to the principles of the present disclosure and FIG. 4 is a schematic illustration of an oil gallery of a piston according to the principles of the present disclosure.

In addition, as shown in FIG. 3B, the combustion bowl rim 128 of the piston 110' can be provided with additional lobes 132 extending inward in a direction perpendicular to the piston pin axis so as to provide the crown surface 114 with increased material (i.e. increased dimension) on opposite sides of the combustion bowl rim 128 in a direction parallel to the vertical piston pin plane 34 and in a direction perpendicular to the vertical piston pin plane 34 in the thrust-antithrust plane. Accordingly, the combustion bowl 126 can follow a circular bowl base path (around piston axis 12) or can have a minimum diameter dimension along the two sets of lobes along both the piston pin vertical plane and perpendicular in the direction of the thrust-antithrust plane. Additional multiple lobes can also be present in correspondence of other piston planes between the piston pin plane and the thrust-antithrust plane.

Figure 4:
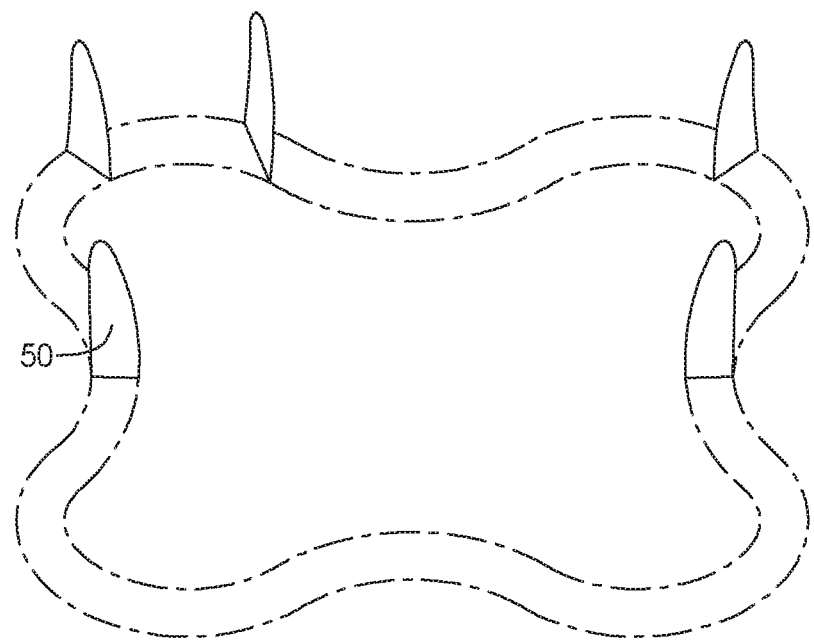
Figure 5:
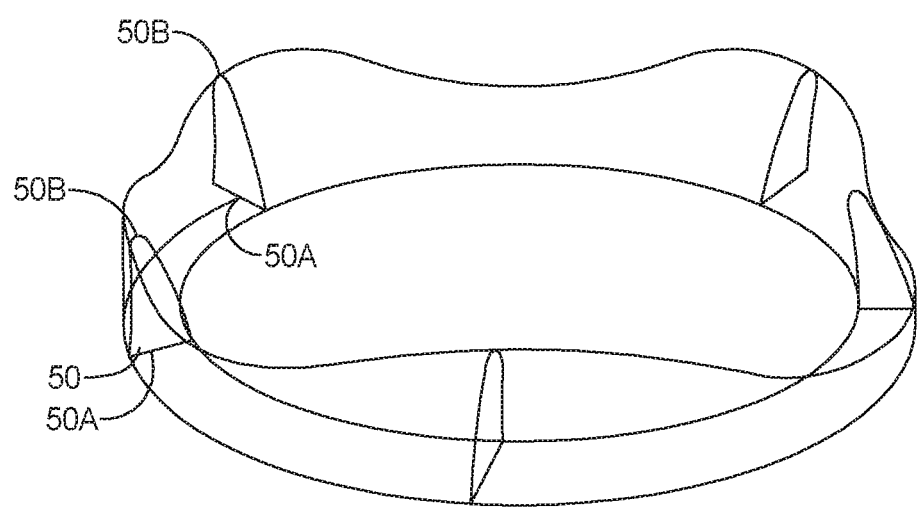
FIG. 5 is a schematic illustration of an alternative oil gallery of a piston according to the principles of the present disclosure.

With reference to FIGS. 1, 2 and 4, the piston 10 can include an internal oil gallery 50 that follows the oval combustion bowl rim contour and/or bowl sidewall contour for cooling the piston 10. As shown in FIG. 3, the internal oil gallery can follow the contour of the multi-lobed combustion bowl 126. The oil gallery 50 can be formed by casting an insert. As shown in FIG. 4, the oil gallery shape 50 can maintain the same section along the entire path that follows the combustion bowl rim path. Alternatively, as shown in FIG. 5, the oil gallery bottom section 50A can change the shape along the path, also following a circular circumferential path around the piston axis 12, while the gallery tip section 50B follows the contour of the combustion bowl rim path 28/128.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A piston for an engine, comprising:
   a piston body having a generally planar crown and a skirt extending from the crown, the piston body including a hole receiving a piston pin having a piston pin axis;

a combustion bowl recessed in the crown and having an oval-shaped bowl rim, wherein the combustion bowl defines an undercut, wherein the oval-shaped bowl rim has a longer first dimension along a major axis that is perpendicular to the piston pin axis and a relatively shorter second minor axis that is parallel to the piston pin axis so that the crown has increased material on opposite sides of the oval-shaped bowl rim in a direction parallel to the piston pin axis; and an oil gallery disposed in the piston that at least partially follows a contour of the combustion bowl.

2. The piston according to claim 1, wherein the oil gallery has an upper section that follows the contour of the oval shaped combustion bowl rim and a bottom section that follows a circular contour.

3. The piston according to claim 1, wherein a bottom of the combustion bowl has a mounded center region.

4. A piston for an engine, comprising:
a piston body having a generally planar crown and a skirt extending from the crown, the piston body including a hole receiving a piston pin having a piston pin axis;
a combustion bowl recessed in the crown and has a bowl rim maximum diameter region and a minimum diameter region that is smaller than the maximum diameter region, the minimum diameter region being along an axis that is parallel to the piston pin axis wherein the crown has increased material on opposite sides of the bowl rim in a direction parallel to the piston pin axis; and an oil gallery disposed in the piston that at least partially follows a contour of the bowl rim, wherein the oil gallery has an upper section that follows the contour of the bowl rim and a bottom section that follows a circular contour.

5. The piston according to claim 4, wherein a bottom of the combustion bowl has a mounded center region.

6. The piston according to claim 4, wherein the bowl rim includes a first pair of lobes defining the minimum diameter region that is along the axis that is parallel to the piston pin axis.

7. The piston according to claim 6, wherein the bowl rim includes a second pair of lobes defining an additional minimum diameter region that is along an axis that is perpendicular to the piston pin axis.

8. The piston according to claim 4, wherein the bowl rim includes multiple pairs of lobes defining multiple minimum diameter regions that are along multiple axes.

* * * * *